Sept. 19, 1944.   C. L. MITCHEL ET AL   2,358,526
METHOD OF PREPARING CHEESE LOAVES AND APPARATUS
Filed Sept. 3, 1943
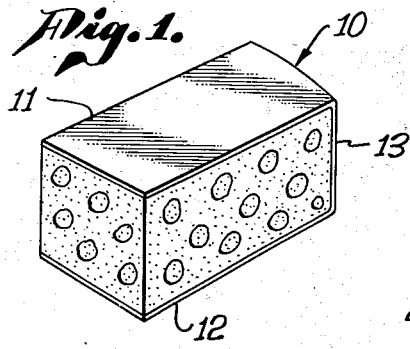
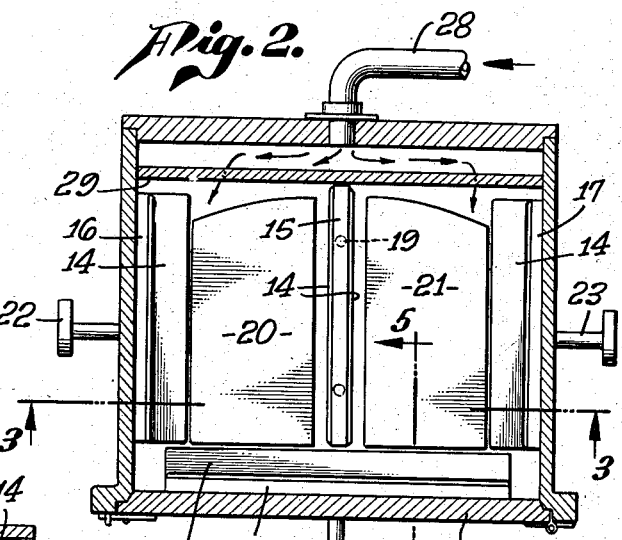
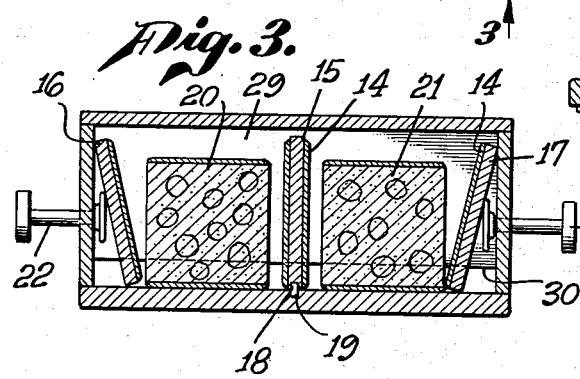
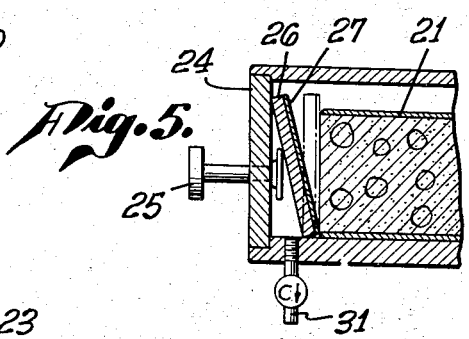
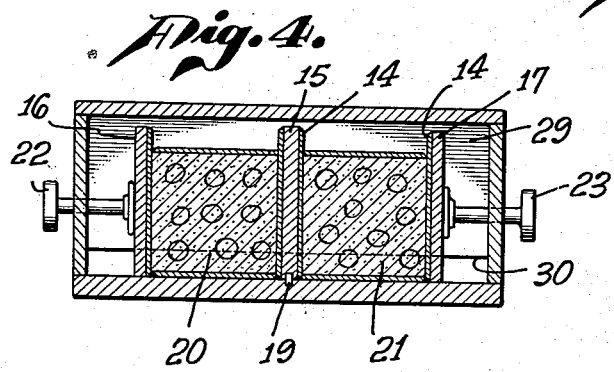
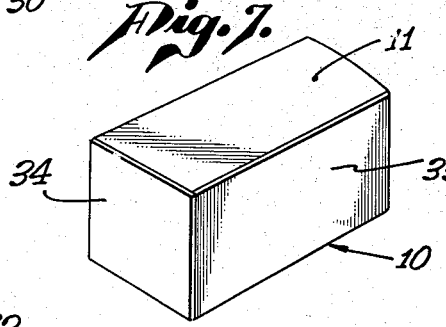
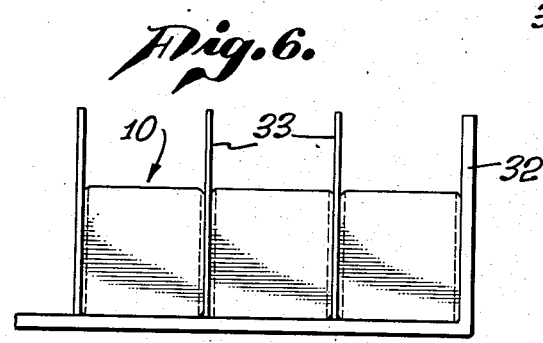
CLYDE L. MITCHEL,
PAUL STOCKLIN
INVENTORS
BY Hazard & Miller
ATTORNEYS Patented Sept. 19, 1944

2,358,526

UNITED STATES PATENT OFFICE 2,358,526

METHOD OF PREPARING CHEESE LOAVES AND APPARATUS

Clyde L. Mitchel and Paul Stocklin, Los Angeles, Calif., assignors to Challenge Cream & Butter Association, Los Angeles, Calif., a corporation of California Application September 3, 1943, Serial No. 501,179

9 Claims. (Cl. 99—115)

This invention relates to a process of preparing cheese loaves and may be regarded as an improvement over the process disclosed in United States Letters Patent No. 2,025,544, issued December 24, 1935, to Clyde L. Mitchel and Elbert L. Wetmore.

As set forth in the above-numbered patent, it is desirable in marketing cheese, particularly Swiss cheese, to cut conveniently sized bricks or loaves from the large "wheels" and to apply to the cut surfaces of the Swiss cheese surface layers of imperforate cheese which protect the cut loaves or bricks from mold and from drying out. As disclosed in that patent, the bricks or loaves have applied to their cut surfaces sections or strips of processed cheese and these are caused to adhere to the surfaces of the bricks by temporarily interposing an electric heating element which partially melts the opposed surfaces of the brick and the processed cheese applied thereto. The partially melted opposed surfaces are then quickly brought together to fuse the brick and applied sections or strips together. The use of an electric heating element to partially melt and thus bring about a fusion between the brick and the processed cheese applied thereto has some disadvantages. There is danger of scorching the cheese during the melting operation and some of the fat is frequently melted and runs out particularly through the pores and eyes of the loaf. Furthermore, as the heat of the electric heating element is a dry heat there is some danger of causing the porous loaf to prematurely dry out.

An object of the present invention is to provide an improved process which will overcome or eliminate these disadvantages enabling sections of "layer" or processed cheese to be applied to the cut surface of the loaf without danger of scorching or causing the fat to run and which has the advantage that the loaves when produced have adequate moisture sealed therein to prevent drying out.

Another object of the invention is to provide a process of preparing a cheese loaf which will facilitate the application of covering layers of processed cheese to the cut surface of a loaf of hard cheese.

With the foregoing and other objects in view, which will be made manifest in the following detailed description and specifically pointed out in the appended claims, reference is had to the accompanying drawing for an illustrative embodiment of the invention wherein:

Figure 1 is a perspective view of a brick or loaf cut from a large "wheel" of Swiss cheese;

Fig. 2 is a horizontal section through a steam chest forming part of the apparatus for carrying out the improved process;

Fig. 3 is a view in vertical section taken substantially upon the line 3—3 upon Fig. 2, in the direction indicated;

Fig. 4 is a view similar to Fig. 3, but illustrating the layers of processed cheese as having been moved into engagement with the cut surfaces of the loaf;

Fig. 5 is a partial view in vertical section taken substantially upon the line 5—5 upon Fig. 2, in the direction indicated;

Fig. 6 is a view in elevation of a rack on which the loaves are positioned after the layers of Swiss cheese have been applied thereto, in accordance with the present invention; and Fig. 7 is a perspective view of the completed loaf or brick.

In carrying out the present invention, the wheels of Swiss cheese as conventionally made by the cheesemaker, first have their rinds scraped and cleaned leaving intact thereon only the more tender part of the natural rind. A loaf indicated at 10 is cut therefrom, it being usually desirable to cut the loaf in such a manner that the softer or tender portion of the natural rind will be left intact thereon at the top and bottom as indicated at 11 and 12, respectively, and around one end as indicated at 13. As the natural rind is relatively imperforate it forms a natural protection to the body of the loaf at the top and bottom and at the mentioned end. If the cheese is expected to be sliced for sandwiches the loaves, as described, may be divided between the top and bottom surfaces and the sloping or curved ends of each resulting brick may be squared off. All cut surfaces of the loaf require protection in the form of an artificial or applied coating. To this end, scraps and butts or those portions of the wheel which are too small to be salable as bricks or loaves are processed. These scraps and butts are melted in a steam kettle together with water and emulsifying salts such as one of the sodium phosphates. The mixture is actively agitated and after it has become a homogenous molten mass it is poured into a mold. This processed cheese on cooling retains most of the initial characteristics of the original Swiss cheese except that it does not have the full flavor of the natural cheese and no eyes are formed therein. Although it is porous to some extent it is relatively imperforate as compared with the body of natural Swiss cheese. The processed cheese after having cooled in the mold is then cut into sections or layers commonly referred to as "layer." These sections are preferably cut to such size as to adequately cover the cut surfaces of the loaf 10. Their thicknesses may vary but a convenient thickness for the average sized loaf is from 13/16" to 1/4". These sections or strips of layer 14 are then temporarily applied to superficiaries provided by boards 15, 16, and 17. As a means for temporarily applying or attaching the sections of layer or processed cheese to the surfaces of the boards, we prefer to employ a thin, edible adhesive. Edible cottage cheese and water to which may be added a small amount of one of the sodium phosphates is heated and stirred until the mixture is quite smooth. It is then allowed to cool and may be utilized as an adhesive for attaching the strips of layer to the faces of the boards. It may be applied to the surfaces of the boards by brushing or in any other preferred manner, and the sections of layer 14 are then applied thereover and are thus temporarily made to adhere to the boards.

The central board 15 has recesses 18 in its bottom edge to receive dowels 19 on the floor or bottom of a steam chest so that when the central board is positioned therein, it will be maintained in an upright position. The central board 15 has sections of layer 14 applied to both of its opposite faces. Bricks 20 and 21 are then inserted into the steam chest on opposite sides of the central board and spaced slightly therefrom. The side boards 16 and 17 have "layer" 14 applied to one face thereof only. These boards are positioned between the outer sides of the loaves 20 and 21 and the side walls of the steam chest. As clearly shown in Fig. 3, these boards are allowed to lean against the side walls of the steam chest over plungers 22 and 23 which are slidable through the side walls. The "layer" 14 on the side boards 16 and 17 is thus disposed in proximity to but spaced from the sides of the loaves.

The steam chest is equipped with a front door 24 through which there is slidable plunger 25. A front board 26 having a section of layer indicated at 27 adhesively fastened to its rear face is positioned in the steam chest so as to lean against the front door. A steam pipe 28 leads to the back of the steam chest and supplies live steam against the back of a baffle board 29 the bottom of which is indicated at 30, see Fig. 3, is spaced somewhat from the bottom of the steam chest. A steam outlet which may be equipped with a pressure regulating valve indicated at 31, permits the exhaust of some steam while retaining steam in the steam chest at the desired pressure and temperature. The loaves 20 and 21 are positioned in the steam chest so that the remaining or intact portion of the natural rind at 11, 12, and 13 will be at the top, bottom, and back, respectively. When the loaves and boards have been placed in the steam chest, as above described, steam is delivered to the steam chest and serves to heat and soften the surfaces of the loaves and the layer 14 which is carried by the boards. Ordinarily, the application of steam is approximately thirty seconds which is sufficient to render the surfaces of the loaves and the "layer" 14 moldable and plastic. The steam is then turned off and plungers 22, 23, and 25 are forced inwardly bringing the layer adhering to side boards 16 and 17 into engagement with the outer sides of the loaves and bodily sliding the loaves into engagement with the "layer" 14 that is adhesively carried on the opposite sides of the center board, as shown in Fig. 4. When plunger 25 is forced inwardly the board 26 carries its "layer" into engagement with the cut forward faces of the loaves, as indicated by dotted lines on Fig. 5. In this manner the relatively imperforate layer of process cheese is effectively welded to the cut surfaces of the loaves, thus forming a type of artificial rind for coating on these cut surfaces. Any equivalent mechanism may be employed in place of the plungers to force the boards into engagement with the cut surfaces of the loaves. The thin cottage cheese adhesive that was initially employed to attach the sections of layer 14 to the faces of the boards permits the "layer" to readily separate from the boards when the "layer" becomes attached to the sides of the loaves. Excess portions of "layer" may then be readily trimmed off and these portions may be saved and reworked to produce further "layer" or other cheese products, as they are completely edible despite the fact that they may have been steam heated in the steam chest.

Before the loaves with their applied sections of layer are completely cooled it is desirable to position them on a suitable rack 32 and to separate them from each other thereon by metal plates 33. The loaves are permitted to cool on this rack while in firm engagement with the plates so that the side surfaces of the finished loaf will be straight and smooth. The completed product is as illustrated in Fig. 7, wherein the three cut sides of the loaf are protected by the applied layer or artificial rind as indicated at 34 and 35. Thus, the completed loaf has on its top, bottom, and back the tender portion of the natural rind of the cheese. The artificial coating or "layer" is welded to and becomes virtually a part of the loaf on its two sides and front. The body of the loaf being thus sealed in by a relatively imperforate coating is adequately protected from premature drying out. It may be dipped in molten wax or paraffin to additionally protect the loaf from drying out and cracking, and to prevent the formation of mold on its exterior. The completed loaf may be readily sliced as desired.

The present process may be employed where the brick or loaf is cut on more than three sides, but if the loaf is cut only on three sides leaving the more tender part of the natural rind on the top and bottom and back, the application of "layer" to the three cut sides can be accomplished in a single operation as above described. The present process is highly advantageous in that as live steam heat is employed there is no danger of scorching. Therefore, tendency of the fat to melt and run out is largely eliminated. The moisture in the steam penetrates the pores or eyes in the loaf and as this moisture is sealed in by the application of the layer 14, the loaf is adequately moist and will not as readily dry out as where the dry heat of an electric heating element is used. The scrap or excess "layer" is not wasted but may be saved and reworked.

It is of course not essential that two loaves be treated simultaneously as indicated, although this procedure is highly preferable for the sake of economy.

While the invention has been primarily developed for use in conjunction with packaging Swiss cheese, it can of course be applied to other hard cheeses that it is desirable to market in the form of conveniently sized and shaped bricks or loaves. The "layer" 14 which forms the artificial rind should be processed from the same type of cheese that forms the body of the loaf.

Various changes may be made in the details of construction without departing from the spirit and scope of the invention as defined by the appended claims.

We claim:

1. The method of preparing a cheese loaf which includes subjecting a loaf of hard cheese and covering "layer" to live steam in close proximity to each other and when the opposed surfaces are rendered plastic, bringing the opposed surfaces into engagement.

2. The method of preparing a cheese loaf which includes temporarily applying sections of imperforate covering "layer" to a superficiary, subjecting a loaf of cheese and the covering "layer" in close proximity to steam heat and when the opposed surfaces are rendered plastic, bringing the opposed surfaces into engagement with the each other.

3. The method of preparing a cheese loaf which comprises cutting a loaf of hard cheese from a wheel so as to retain thereon the softer portion of its natural rind on certain surfaces, positioning covering "layer" adjacent the cut surfaces of the loaf, subjecting the loaf and the "layer" to live steam, and bringing the "layer" into engagement with the cut surfaces of the loaf.

4. The method of preparing a cheese loaf which comprises positioning a loaf of hard cheese in a steam chest, applying covering "layer" to superficiaries and positioning the superficiaries in the steam chest in close proximity to the loaf, subjecting the loaf and the covering "layer" to live steam, and when the opposed surfaces thereof are rendered plastic, bringing the covering "layer" into engagement with the loaf.

5. The method of preparing a cheese loaf which comprises positioning a loaf of hard cheese in a steam chest, applying covering "layer" to superficiaries and positioning the superficiaries in the steam chest in close proximity to the loaf, subjecting the loaf and the covering "layer" to live steam, and when the opposed surfaces thereof are rendered plastic, bringing the covering "layer" into engagement with the loaf, removing the loaf from the steam chest and allowing the same to cool between shaping surfaces.

6. An apparatus for preparing a cheese loaf comprising a steam chest, means for supplying steam thereto, a central superficiary providing means, means for causing the central superficiary providing means to stand upright in the steam chest, side superficiary providing means adapted to be positioned in the steam chest and to lean against walls thereof, and means for forcing the side superficiaries toward the center superficiary providing means.

7. The method of providing a cheese loaf which includes introducing live steam between a cut surface of a brick of hard cheese and covering "layer" until the opposed surfaces of the hard cheese and covering "layer" are rendered plastic and bringing the opposed surfaces of the hard cheese and covering "layer" into mutual engagement.

8. The method of preparing a cheese loaf which includes adhesively fastening a covering "layer" to a superficiary, positioning said "layer" in close proximity to a loaf of hard cheese but in spaced relation thereto, subjecting the loaf and "layer" to live steam until the opposed surfaces are rendered plastic and bringing the opposed surfaces into mutual engagement.

9. An apparatus for preparing a cheese loaf comprising a steam chest, means for supplying steam thereto, means providing superficiaries removably positioned in the steam chest so as to be opposite two sides and the front of a loaf of hard cheese positioned in the steam chest, and means for forcing the superficiary providing means towards the sides of the loaf.

CLYDE L. MITCHEL.
PAUL STOCKLIN.